No. 706,391. Patented Aug. 5, 1902.
W. D. COOKSON.
CLUTCH.
(Application filed July 2, 1901.)
(No Model.) 2 Sheets—Sheet 1.

No. 706,391. Patented Aug. 5, 1902.
W. D. COOKSON.
CLUTCH.
(Application filed July 2, 1901.)
(No Model.) 2 Sheets—Sheet 2.

UNITED STATES PATENT OFFICE.

WILLIAM DAWSON COOKSON, OF GATESHEAD, ENGLAND, ASSIGNOR TO CLARKE CHAPMAN & COMPANY, LIMITED, OF GATESHEAD, ENGLAND.

CLUTCH.

SPECIFICATION forming part of Letters Patent No. 706,391, dated August 5, 1902.

Application filed July 2, 1901. Serial No. 66,900. (No model.)

*To all whom it may concern:*

Be it known that I, WILLIAM DAWSON COOKSON, a subject of the King of Great Britain and Ireland, residing at Gateshead-on-Tyne, in the county of Durham, England, have invented Improvements in Clutches, of which the following is a specification.

This invention relates to clutches suitable for various uses and especially for putting the cable holder or lifter of a windlass in or out of engagement with the driving-wheel.

My improved clutch comprises in combination a movable part clutch adapted to be moved into and out of engagement with another part clutch according to requirement, a ring or strap with female screws, spindles formed with male screws that engage with said female screws and which can rotate in and are held longitudinally by suitable bearings, and gear-wheels that are engaged by suitable hand-operated mechanism common to both of said gear-wheels, so as to actuate the movable part clutch, the whole so constructed and arranged that by actuating said mechanism the said part clutch can be moved into gear or out of gear with its fellow part clutch and that when either in or out of gear therewith it will be so retained by said arrangement of mechanism.

In a windlass embodying this invention the ring or strap is mounted in a groove formed in a boss on the cable holder or lifter which constitutes the movable part clutch. The screw-spindle bearings are carried in an outer frame, and the gear-wheels on said spindles may be either spur or worm wheels.

Figure 1:
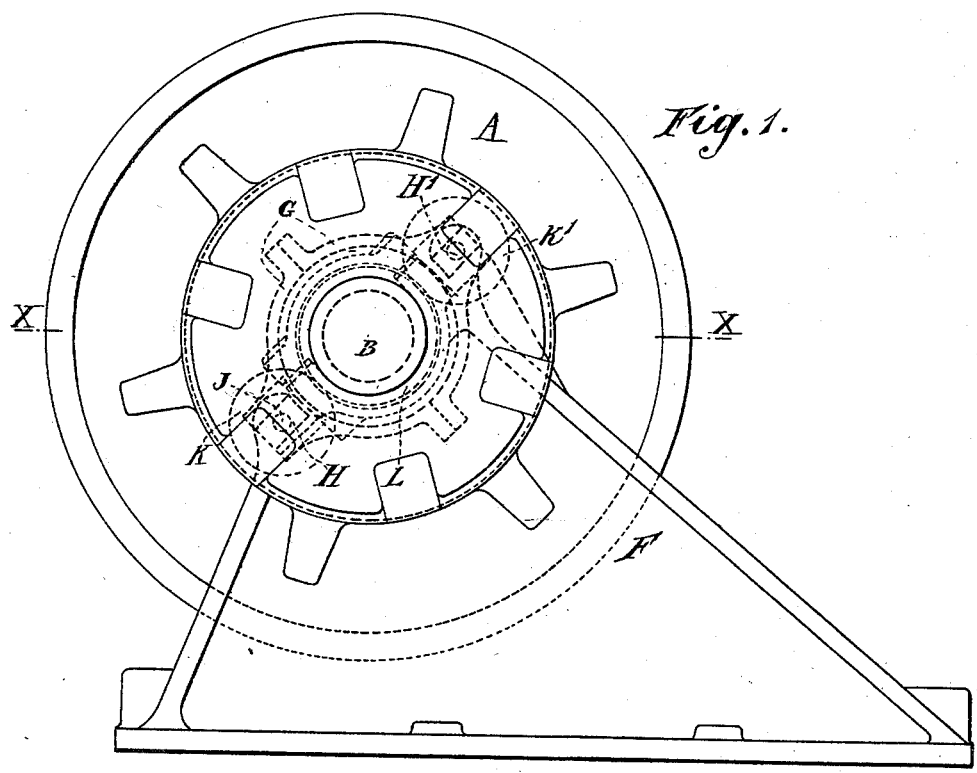
Figure 2:
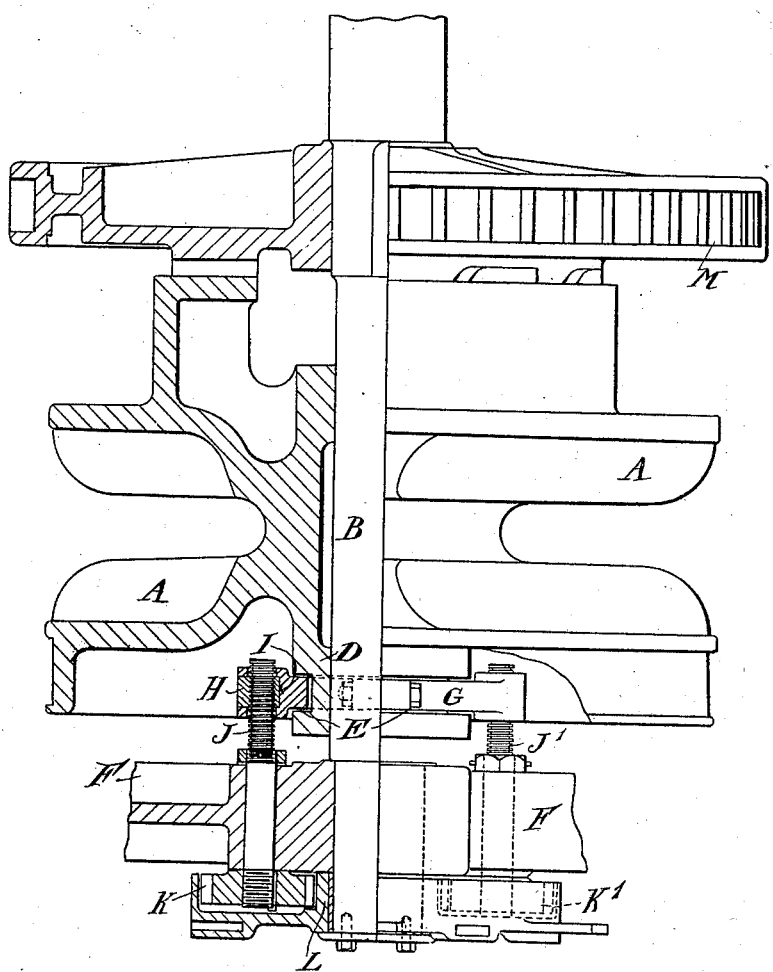

Referring to the accompanying illustrative drawings, Figure 1 shows in end elevation my invention as applied in a windlass. Fig. 2 is partly a plan and partly a section on the line X X of Fig. 1.

In the arrangement illustrated, A is a part clutch constituting a cable holder or lifter. It is mounted on a main shaft B, supported in bearings in the frame F. The part A has at one end a boss D, that is formed with a groove E, in which is located a ring or strap G, formed with recesses into which nuts H and H' are fitted.

J J' are spindles that are carried in bearings in the outer frame F and are screw-threaded at their inner ends to correspond with and are engaged with the nuts H and H', and at or near their outer ends said spindles have fixed thereon spur-wheels K and K', which gear with a central spur-wheel L, that is loosely mounted on the main shaft B and is formed as a hand-wheel by turning, which when desired the spur-wheels K K' may be rotated in the required direction to put the part clutch A in or out of gear with the other part clutch which is on the driving-wheel M. The hand-wheel extends beyond and incloses the spur-wheels. With this arrangement the part clutch A can only be moved lengthwise of the shaft by turning the hand-wheel and will be retained in the position along shaft B to which it may have been moved.

What I claim is—

1. A clutch comprising in combination a part clutch connected to a shaft so as to rotate therewith, a second part clutch mounted upon said shaft and adapted to be moved along it into or out of engagement with said other part, a groove in said movable part, a ring or strap located in said groove and surrounding said longitudinally-movable part, leaving same free to rotate independently but which ring or strap is adapted when itself moved lengthwise of the shaft to move said part along with it, screw-threaded openings or nuts in said ring or strap, screw-spindles that extend through said openings or nuts, bearings wherein said spindles are mounted and can rotate and whereby they are held longitudinally, spur-wheels on said spindles and in gear with said wheels a central spur-wheel adapted through said spur-wheels, spindles and ring or strap to actuate the movable part, substantially as described.

2. A windlass-clutch comprising in combination a part clutch constituting a cable holder or lifter, or a windlass, and which part is mounted upon a shaft and is adapted to be moved along it into or out of engagement with a second part clutch connected to said shaft so as always to rotate with it, a groove in said movable part, a ring or strap located in said groove and surrounding said longitudinally-movable part, leaving same free to rotate independently but which ring or strap is adapted when itself moved lengthwise of the shaft to move said part along with it, screw-threaded openings or nuts in said ring or strap, screw-spindles that extend through said openings or nuts, bearings wherein said spindles are mounted and can rotate and whereby they are held longitudinally, spur-wheels on said spindles and in gear with said wheels a central spur-wheel loose on said shaft and formed as a hand-wheel and adapted to operate through said spur-wheels, spindles and ring to the movable part, substantially as described.

Signed at Gateshead, in the county of Durham, England, this 19th day of June, 1901.

WILLIAM DAWSON COOKSON.

Witnesses:
ARCHIBALD ROXBURGH,
THOMAS HENDERSON.